United States Patent
Sato

[11] Patent Number: 5,273,235
[45] Date of Patent: Dec. 28, 1993

[54] FISHING REEL HAVING A BRAKE MECHANISM FOR BRAKING A ROTARY ELEMENT

[75] Inventor: Jun Sato, Sakai, Japan
[73] Assignee: Shimano Inc., Osaka, Japan
[21] Appl. No.: 881,503
[22] Filed: May 11, 1992

[30] Foreign Application Priority Data
May 16, 1991 [JP] Japan .................. 3-034441[U]

[51] Int. Cl.⁵ ................ A01K 89/033; A01K 89/0155
[52] U.S. Cl. ........................................ 242/288; 242/283
[58] Field of Search ............... 242/288, 283; 310/93, 310/105

[56] References Cited

U.S. PATENT DOCUMENTS

| | | | |
|---|---|---|---|
| 4,535,954 | 8/1985 | Worth | 242/288 |
| 4,830,308 | 5/1989 | Puryear | 242/288 |
| 5,108,042 | 4/1992 | Puryear | 242/288 |

FOREIGN PATENT DOCUMENTS

| | | | |
|---|---|---|---|
| 58-115964 | 8/1983 | Japan | 242/288 |
| 58-164478 | 11/1983 | Japan | |
| 3-34441 | 5/1991 | Japan | |

Primary Examiner—Katherine Matecki
Attorney, Agent, or Firm—Dickstein, Shapiro & Morin

[57] ABSTRACT

A fishing reel includes a spool for taking up a fishing line and acting as an electric conductor also, and a brake mechanism having permanent magnets arranged adjacent a side face of the spool. The brake mechanism includes a controller for controlling a distance between the magnets and spool, and a perforated shield plate formed of a magnetic substance for insertion between the magnets and spool. The shield plate is interlocked to the controller such that magnetic flux of the magnets is shielded in a progressively increasing amount as the controller is operated in a direction to increase the distance between the magnets and spool.

5 Claims, 6 Drawing Sheets

FISHING REEL HAVING A BRAKE MECHANISM FOR BRAKING A ROTARY ELEMENT

BACKGROUND OF THE INVENTION

1. Field of the Invention

This invention relates to a fishing reel having a brake mechanism for braking a rotary element, and more particularly to a fishing reel comprising a rotary element for taking up a fishing line, an electric conductor formed in a system rotatable with the rotary element, permanent magnets arranged adjacent the electric conductor, and a brake mechanism for applying a braking force to the rotary element by causing magnetic flux of the permanent magnets to induce electric current on the electric conductor.

2. Description of the Related Art

A known brake mechanism as constructed above is often called a mag-brake. This type of brake mechanism employs an electric conductor formed of aluminum, copper or other non-magnetic substance. The quantity of magnetic flux of the permanent magnets applied to the electric conductor is controllable by a control system that varies a distance between the conductor and permanent magnets or by means of a perforated shield plate formed of a magnetic substance. When the fishing reel is used, electric current induced on the conductor is varied by the above control, to adjust the braking force applied to the spool (rotary element). See Japanese Utility Model Publication Kokai No. 60-94072 or No. 58-164478.

This type of brake mechanism is used in a baitcasting reel, and has a function to check a backlash at a casting time.

This brake mechanism includes no component that contacts the spool or other rotatable element, and therefore is capable of smooth braking action. With the structure in which the distance between the electric conductor and permanent magnets is varied as disclosed in Japanese Utility Model Publication Kokai No. 60-94072, the distance may be reduced to apply a relatively strong braking force. However, when the distance between the conductor and permanent magnets is increased to lessen the braking force, a certain quantity of magnetic flux is still applied to the conductor. Thus, there is a limit to reduction of the braking force.

Where the perforated shield plate is used as in Japanese Utility Model Publication Kokai No. 58-164478, the braking force may be reduced without increasing the distance between the conductor and permanent magnets. However, the braking force cannot be increased greatly since the conductor and permanent magnets have a fixed distance therebetween. In this sense, the two prior art structures have room for improvement.

SUMMARY OF THE INVENTION

The object of the present invention is to provide a fishing reel of simple structure having a brake mechanism whose braking force is readily adjustable from high value to low value while retaining the advantage of smooth braking action.

The above object is fulfilled, according to the present invention, by a fishing reel comprising a brake mechanism for applying a braking force to a rotary element by action of an electric conductor and permanent magnets, a controller for controlling a distance between the permanent magnets and electric conductor, and a shield plate formed of a magnetic substance for insertion between the permanent magnets and the electric conductor when the controller is operated to move the permanent magnets away from the electric conductor, wherein the shield plate is interlocked to the controller such that the magnetic flux of the permanent magnets is shielded in a progressively increasing amount as the controller is operated in a direction to increase the distance between the permanent magnets and the electric conductor.

This fishing reel has the following functions and effects:

Where the above features are arranged as shown in FIGS. 1 through 5, for example, a controller 29 is operated to reduce the distance between permanent magnets 28 and electric conductor 6 (rotary element 6 itself acts as the conductor) to increase magnetic flux of the magnets 28 applied to the conductor 6, thereby increasing the braking force. For reducing the braking force, the controller 29 is operated to increase the distance between permanent magnets 28 and electric conductor 6 and also to insert a shield plate 30 between the permanent magnets 28 and electric conductor 6. The shield plate 30 intercepts the magnetic flux, thereby to substantially reduce the magnetic flux acting on the conductor 6.

Thus, according to this invention, the braking force may be increased by adjusting the distance between the permanent magnets 28 and conductor 6. In addition, the braking force may be reduced to a very small value by using the shield plate 30 to substantially reduce the magnetic flux acting on the conductor, without greatly increasing the distance between the permanent magnets 28 and conductor 6.

This fishing reel, though not enlarged in construction, has a brake mechanism whose braking force is readily adjustable from high value to low value while retaining the advantage of smooth braking action using the permanent magnets and electric conductor.

Other features and advantages of the present invention will be apparent from the following description of the preferred embodiment.

DETAILED DESCRIPTION OF THE PREFERRED EMBODIMENTS

Figure 1:
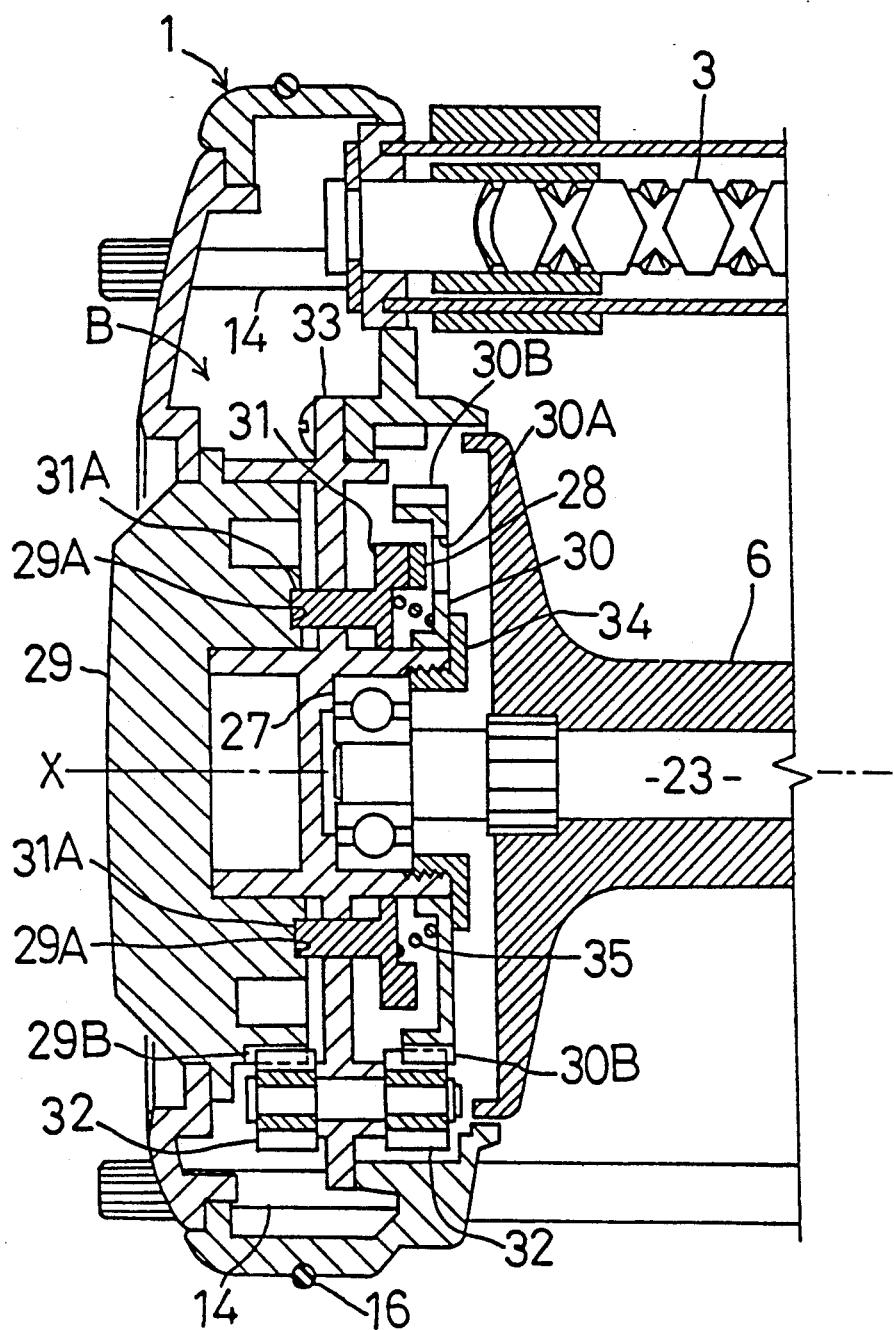
FIG. 1 is a sectional view of a left part of a fishing reel.

A fishing reel according to the present invention will be described in detail with reference to the drawings.

FIGS. 1 through 7 show a baitcasting reel embodying the present invention. The reel comprises a left case 1, a right case 2, and a level wind mechanism mounted in a front position between the left and right cases 1 and 2 and including a screw shaft 3, a guide rod 4 and a line guide 5. Further, the reel has a rotatable spool 6 mounted centrally thereof and a clutch controller 7 mounted in a rear position. The right case 2 supports a handle 8, a drag controller 9, and a cast controller 10.

In this reel, parts of the left case 1 and right case 2, and an upper thumb rest 11 and a pair of lower frames 12 are formed into an integral unit A by aluminum die casting. To form a reel body, a cover 2A is disposed to extend over an outer side of the right case 2. A mounting foot 13 extends between the pair of lower frames 12 to be secured to a fishing rod.

Figure 6:
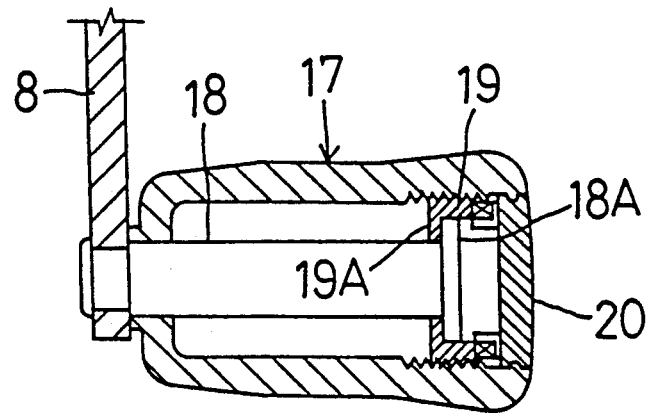
FIG. 6 is a sectional view of a paddle.
Figure 7:
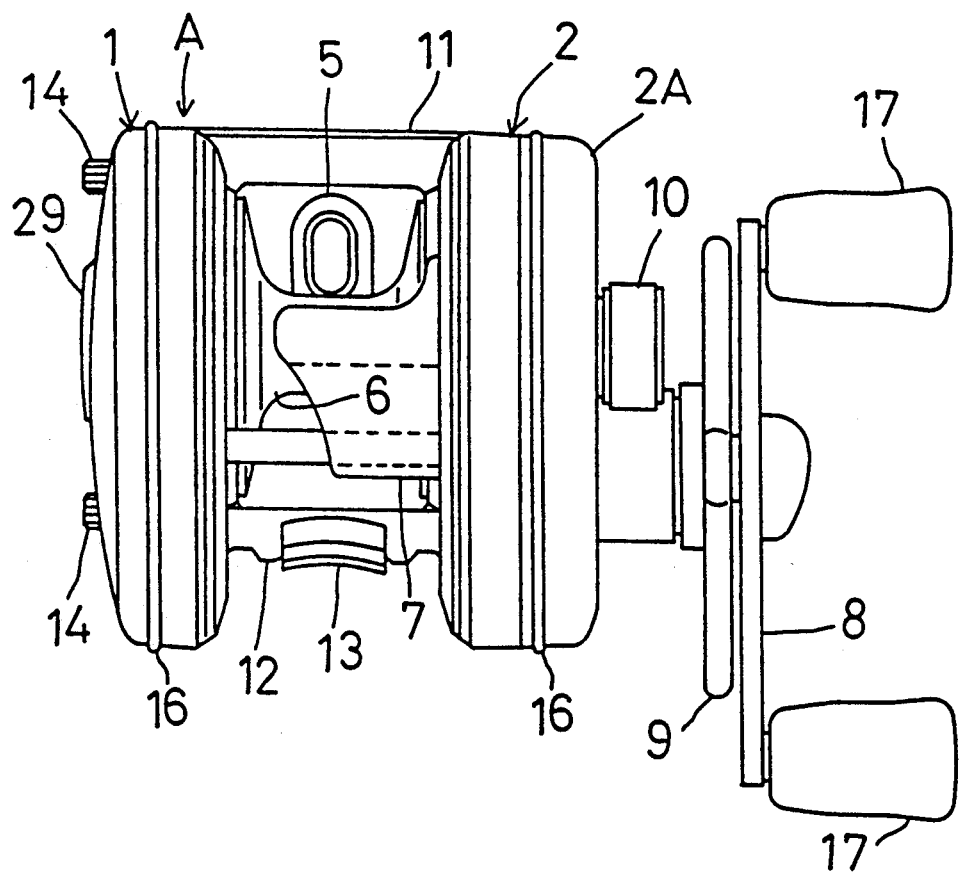
FIG. 7 is a rear view of the fishing reel.

The cover 2A is removably attached to the right case 2 by means of a plurality of bolts 14 extending to the cover 2A through the left case 1. Nuts 15 screwed to threaded ends of the bolts 14 are unrotatably fitted in countersinks 2B formed in the cover 2A. Elastic rings 16 are fitted peripherally of the left case 1 and cover 2A, respectively, to protect the reel body from damage. The handle 8 has paddles 17 each of which is freely rotatably supported on an axis 18 as shown in FIG. 6. Each paddle 17 includes a ring 19 meshed with an inner wall thereof and having a flange 19A. A cap 20 is fitted in the paddle 17 for holding the ring 19 in place and for adjusting a clearance between the flange 19A and a head 18A of the axis 18 to check chattering.

Figure 2:
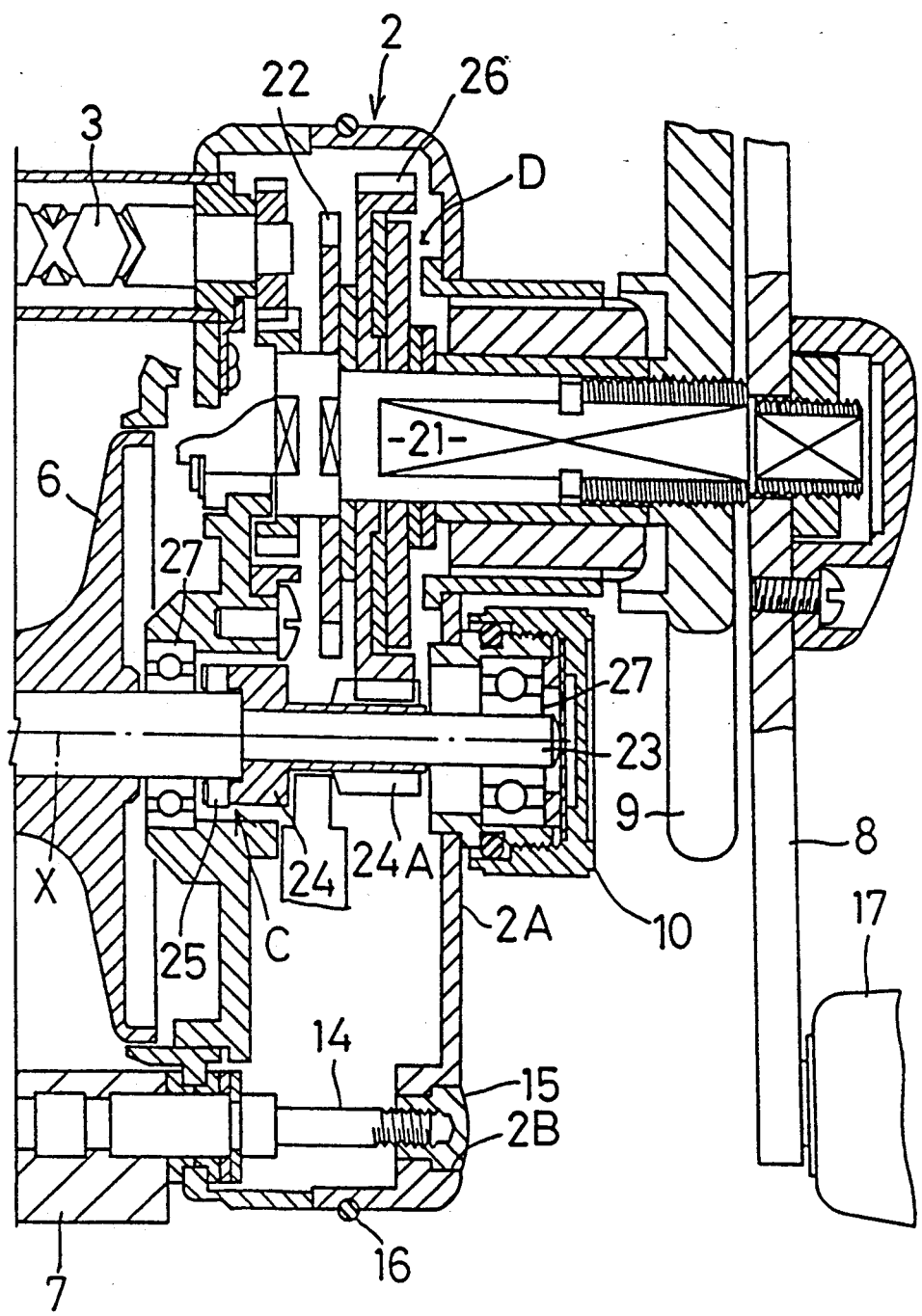
FIG. 2 is a sectional view of a right part of the fishing reel.
Figure 3:
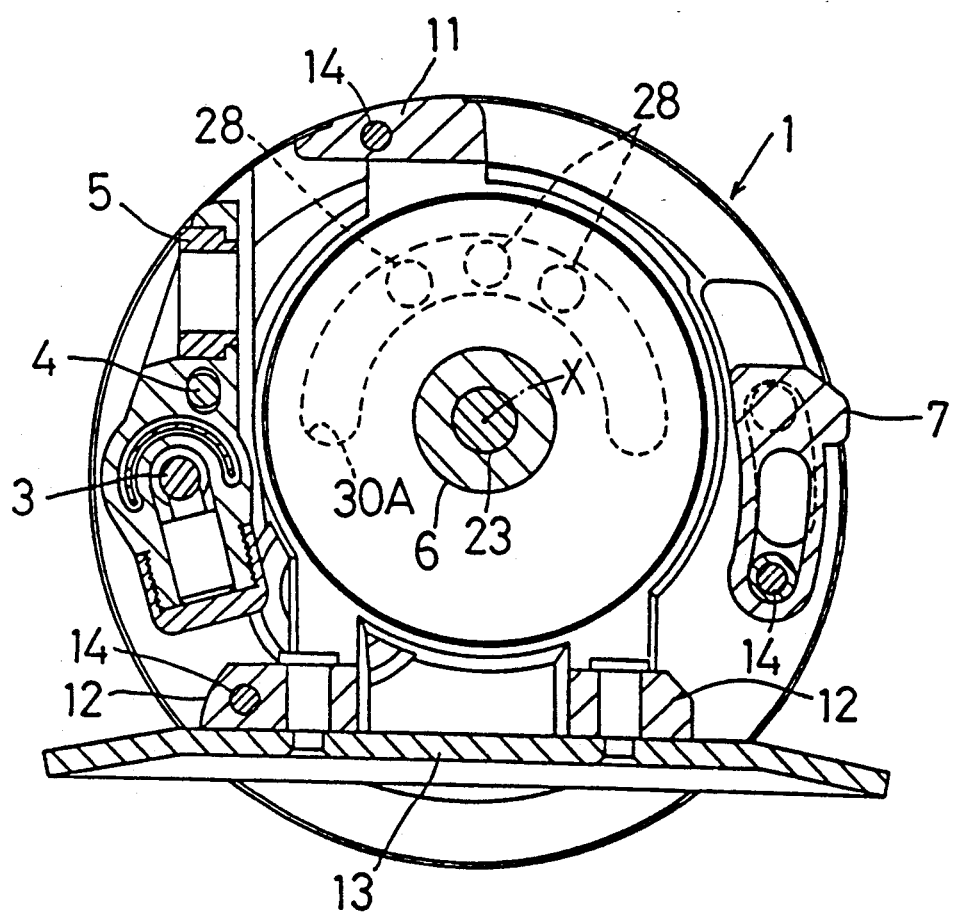
FIG. 3 is a side view in vertical section of the fishing reel.
Figure 4:
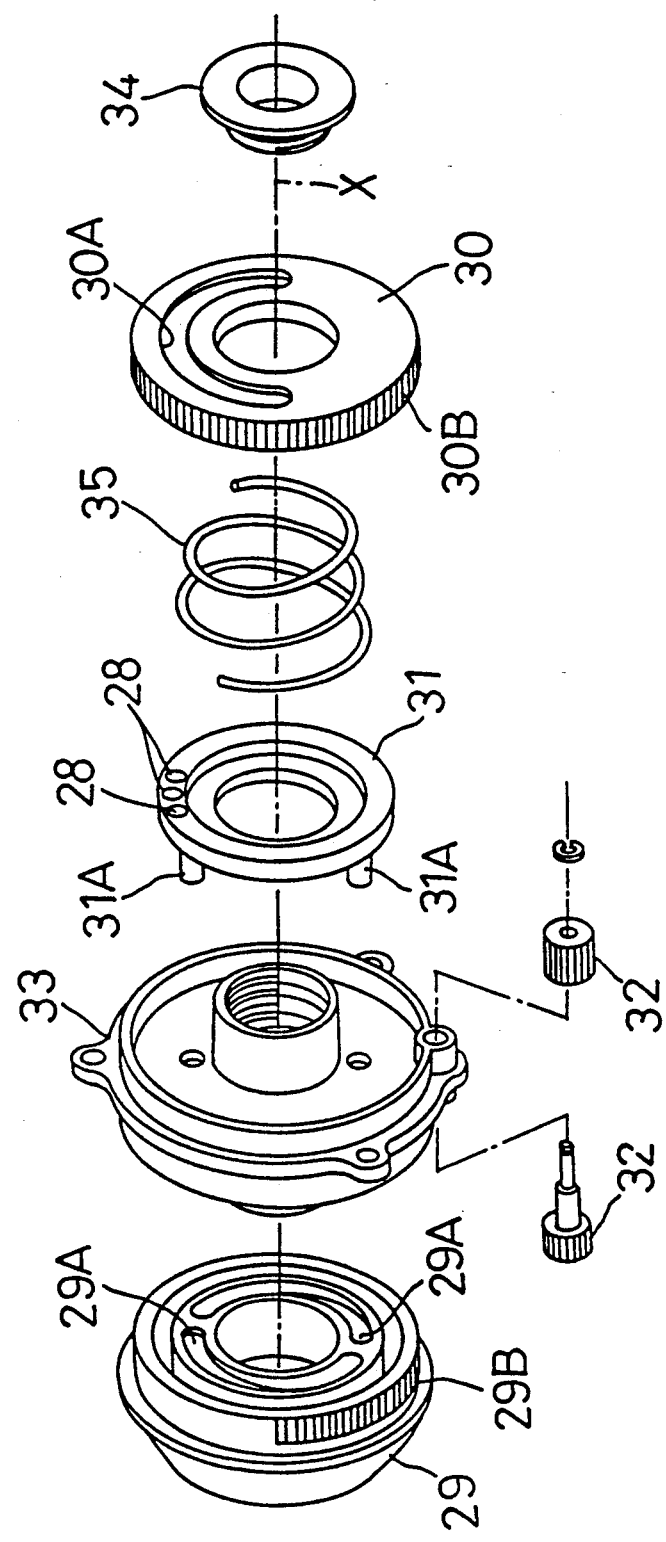
FIG. 4 is an exploded perspective view of a brake mechanism.
Figure 5:
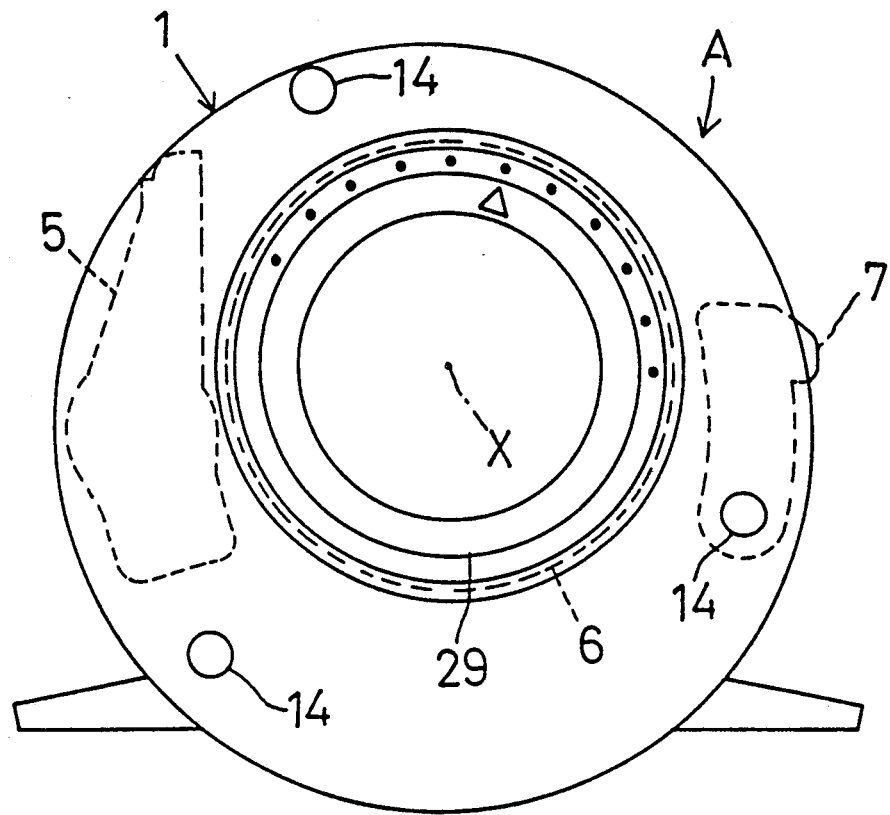
FIG. 5 is a left side view of the fishing reel.

As shown in FIG. 2, the handle 8 and drag controller 9 are mounted on a handle shaft 21 extending from the right case 2. The handle shaft 21 supports a drag mechanism D and a ratchet wheel 22 mounted on an inward end portion thereof. A spool shaft 23 rotatable with the spool 6 supports a clutch sleeve 24 slidably mounted thereon and a pin 25 fixed to the spool shaft 23 to be engageable with the clutch sleeve 24. The clutch sleeve 24 and pin 25 constitute a clutch mechanism C. The clutch sleeve 24 has an input gear 24A meshed with an output gear 26 of the drag mechanism D, whereby torque from the handle 8 is transmitted to the spool 6 through the drag mechanism D and clutch mechanism C.

The clutch mechanism C is disengageable by operating the clutch controller 7 (the interlock therebetween will not particularly be described). The spool shaft 23 is supported at opposite ends thereof by bearings 27. The cast controller 10 is screwed to the right case 2 for adjusting a frictional force applied to the righthand end of the spool shaft 18.

As shown in FIG. 1, the left case 1 has a magnet type brake mechanism B mounted therein for preventing backlashes. The brake mechanism B includes permanent magnets 28 disposed adjacent a side face of the spool 6 which is formed of a metal to act also as an electric conductor. The distance between the magnets 28 and the side face of the spool 6 is adjustable by turning a brake controller 29. When the controller 29 is turned in a direction to move the magnets 28 away from the spool 6, a shield plate 30 formed of a magnetic substance is inserted between the magnets 28 and spool 6.

Specifically, the controller 29 includes a pair of cam grooves 29A and a gear portion 29B on an inward face thereof opposed to the spool 6, the cam grooves 29A extending around an axis X of rotation of the controller 29. The plurality of magnets 28 are mounted on a movable member 31 having projections 31A for engaging the cam grooves 29A. The shield plate 30 is in the form of a disk defining an arcuate opening 30A and a gear portion 30B for rotating the plate 30. The gear portion 30B is connected to the gear portion 29B of the controller 29 through intermediate gears 32. The movable member 31 and shield plate 30 are supported on an intermediate member 33 as sandwiched between the intermediate member 33 and a screw member 34. The movable member 31 is biased by a coil spring 35 so that the projections 31A contact the cam grooves 29A.

With this brake mechanism B, when the controller 29 is turned in a direction to increase a braking force, the cam grooves 29A push the movable member 31 toward the spool 6 to increase magnetic flux of the magnets 28 acting on the side face of the spool 6 through the opening 30A of the shield plate 30. When the controller 29 is turned in the direction to decrease the braking force, the cam grooves 29A allow the movable member 31 to move away from the spool 6 to decrease the magnetic flux of the magnets 28 acting on the side face of the spool 6. When the magnets 28 reach a predetermined position with the above movement away from the spool 6, the shield plate 30 driven by the controller 29 through the intermediate gears 32 drastically reduces the magnetic flux applied from the magnets 28 to the side face of the spool 6.

The above embodiment may be modified in various ways. For example, a copper plate, an aluminum plate or the like may be attached to the side face of the spool to act as a conductor. A brake mechanism according to the present invention may be provided for a system that receives power from the spool.

The brake controller 29 may be disposed in a rear position of the reel to facilitate adjustment of the braking force while a bait is cast.

What is claimed is:

1. A fishing reel comprising:
    a reel body including a pair of cases;
    a handle rotatably mounted on one of said cases;
    a rotary element for taking up a fishing line, said rotary element having an axis of rotation;
    a transmission mechanism for transmitting torque from said handle to said rotary element; and
    a brake mechanism for applying a braking force to said rotary element, said brake mechanism including:
        an electric conductor rotatable in association with said rotary element;
        permanent magnets for generating a magnetic flux and for inducing an electric current in said electric conductor, said magnets being disposed within said reel body adjacent said electric conductor;
        a controller for moving said permanent magnets toward and away from said electric conductor and for thereby controlling the distance between said permanent magnets and said electric conductor in a direction parallel to the axis of said rotary element, said controller being disposed within said reel body; and
        a shield plate formed of a magnetic substance, said fishing reel including means for moving said shield plate between said permanent magnets and said electric conductor when said controller is operated to move said permanent magnets away from said electric conductor; and
    wherein, in response to the operation of said controller to move said permanent magnets away from said electric conductor, said shield plate shields the electrical conductor from the magnetic flux of said permanent magnets in a progressively increasing amount.

2. A fishing reel as claimed in claim 1, wherein said controller is rotatable to control the distance between said permanent magnets and said electric conductor.

3. A fishing reel as claimed in claim 2, wherein said controller (29) includes an inner face, a pair of cam grooves (29A), and a gear portion (29B), said gear portion being located on said inner face, said inner face being opposed to said rotary element, said controller having an axis of rotation, said cam grooves extending around said axis of said controller, and said fishing reel including a ring-shaped movable member (31) having projections (31A) for engaging said cam grooves, said magnets being mounted on said movable member.

4. A fishing reel as claimed in claim 3, wherein said shield plate (30) is disc-shaped, said shield plate having a face and a periphery, said face being opposed to said electrical conductor, an opening being defined in said face of said shield plate, said fishing reel further including a gear portion (30B) for rotating said shield plate, said gear portion being located in said periphery of said shield plate, and said fishing reel including intermediate gears (32), said gear portion (30B) of said shield plate (30) being connected to said gear portion (29B) of said controller (29) through said intermediate gears such that said shield plate is rotated in response to rotation of said controller (29).

5. A fishing reel as claimed in claim 4, further comprising an intermediate member (33), and a screw member (34) screwed to said intermediate member (33), wherein said movable member (31) and said shield plate (30) are supported on said intermediate member (33), and an elastic member (35) for biasing said movable member (31) such that said projections (31A) contact said cam grooves (29A), said elastic member being located between said movable member and said shield plate.

* * * * *